OR CIRCUIT

INVENTOR
ALLAN A. KAHN
BY Arthur S. Tenser
ATTORNEY

Nov. 17, 1964 A. A. KAHN 3,157,794

MAGNETIC CORE LOGICAL CIRCUITS

Filed Nov. 20, 1959 2 Sheets-Sheet 2

United States Patent Office 3,157,794
Patented Nov. 17, 1964

3,157,794
MAGNETIC CORE LOGICAL CIRCUITS

Allan A. Kahn, Bronx, N.Y., assignor to International Business Machines Corporation, New York, N.Y., a corporation of New York Filed Nov. 20, 1959, Ser. No. 854,476
4 Claims. (Cl. 307—88)

This invention relates to logical circuits, and more specifically to such circuits utilizing magnetic cores as the principal components thereof.

The rectangular loop magnetic core has established itself as an extremely useful component in digital computer circuits. Its bistable hysteresis characteristic is employed to advantage in magnetic memories and to some extent in logical switching circuits. With respect to the latter, the relatively slow speed and high cost of the circuitry heretofore known have restricted its use to small, slow machines. The present invention, by combining a unique arrangement of magnetic cores and transistor driving stages, provides relatively inexpensive core circuitry operating at higher speeds, whereby the inherent reliability and other advantages of the magnetic devices are employed to full advantage.

Accordingly, it is the primary object of this invention to provide improved logical circuitry.

Another object of this invention is to provide logical circuitry utilizing magnetic cores wherein speed of operation is increased and required driving power decreased.

Still another object of this invention is to provide a magnetic signal transfer stage suitable for use in logical circuitry wherein the size of the magnetic cores and the number of turns of the windings thereon are reduced to a minimum.

Yet another object of this invention is to provide a high speed magnetic signal transfer circuit adaptable with but minor changes to perform all of the basic logical functions required to formulate entire computing machines.

In accordance with the invention, a basic transfer stage is provided consisting of three square hysteresis loop magnetic cores; an input core, an output core, and a storage core, each of which has a pair of stable states designated as the "0" and "1" conditions in accordance with conventional binary notation. A single wire loop is magnetically coupled to all three of the cores, providing a single output winding on the input and storage cores and a single turn input winding on the output core. The single turn output windings on the input and storage cores are oriented in bucking relationship so that simultaneous switching of both cores to the same state will produce no net current flow in the loop. The input windings on the input and storage cores are arranged in series with a driving source which may conveniently be a transistor amplifier stage. A pair of resetting drive means are also coupled respectively to the storage and output cores of the circuit. These two driving means alternately reset the storage and output cores during successive time intervals. An output winding on said output core provides a pulse output when said output core is being reset.

When an input pulse is applied to the series input windings of said input and storage cores, both cores are switched to their logical "1" state. However, because their single turn output windings are in bucking relationship, no net current is produced in the loop. Immediately following the input signal period, a reset pulse is applied to the storage core. This pulse resets the storage core to its "0" state, the input core half way to its "0" state, and the output core half way to its "1" state. Immediately following the period of this reset pulse, a reset pulse is applied to the output core. This pulse sets the output core to its "0" state and the input core to its "0" state. The voltage developed in the output winding during this reset is applied as the input to the succeeding circuit. It will be noted at this time, that all three of the cores are in their "0" state at the conclusion of the cycle and therefore ready to receive the next input signal. As will be seen more clearly hereinbelow, the output core is never switched completely between its "0" and "1" logical states, the widest switching range being half way between. Therefore this core can be half the size of the input or storage cores. Also, within the loop all of the cores are unloaded during each cycle of operation, thereby permitting a single turn winding to link the three cores. This in turn, permits the use of cores of smaller dimensions.

By varying the input circuitry to the input and storage cores, e.g., by providing plural inputs to both said cores, various logical functions may be performed within the transfer stage without increased time delay. An entire logical system may be formulated by suitably interconnecting the individual stages.

Preferably, transistor amplifiers are used to drive each stage and coupling between stages is provided through these amplifiers. The output winding of the output core of each circuit is coupled to the input, for example, the base, of the transistor driving the succeeding stage. The increase in power supplied by the amplifier enables the output of any stage to drive several other stages, thereby providing the branching required in any logical system. Additional amplifiers are unnecessary.

The foregoing and other objects, features and advantages of the invention will be apparent from the following more particular description of preferred embodiments of the invention, as illustrated in the accompanying drawings.

Figure 1:
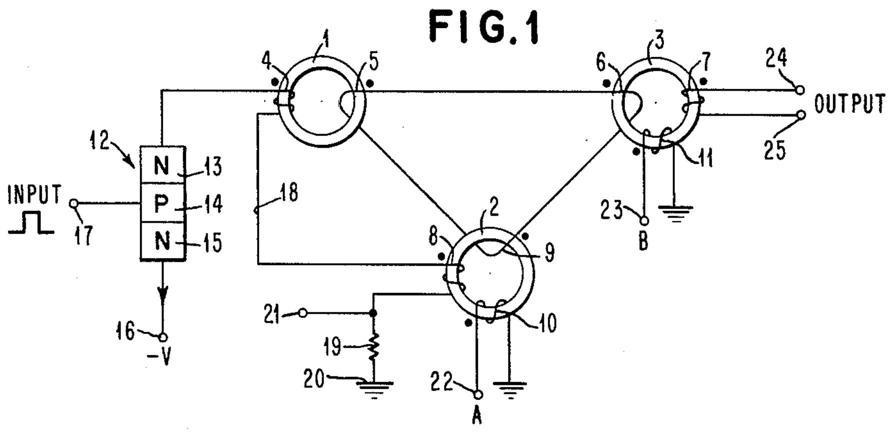
FIG. 1 is a circuit diagram of the basic transfer stage of this invention.

Before describing the invention in detail, it is to be understood that all of the magnetic core elements shown in the drawings are fabricated of any suitable material exhibiting a rectangular loop hysteresis characteristic. The properties of such materials are well known and it is believed unnecessary to describe them in detail. It is deemed sufficient to note that a core made of these materials may be saturated in either of two directions, dependent upon the direction of current flow provided in the input windings magnetically coupled to the core. The rectangular hysteresis characteristic results in substantial magnetic remanence in either direction of saturation. The core therefore exhibits two stable conditions and may be switched from one to the other by suitably applied magnetizing currents. During the switching of a core from one condition of saturation to the other, the flux change within the core will induce a current in a winding magnetically coupled thereto in the manner of the ordinary transformer. For convenience in describing the invention, one of the stable conditions of each core will be termed the "0" state and the other the "1" state, in accordance with standard binary notation. As shown in the drawings, these cores may most conveniently be of toroidal shape, although other suitable configurations may be used.

FIG. 1 shows the basic transfer circuit of the invention. This arrangement comprises three cores; an input core 1, a storage core 2, and an output core 3. Input core 1 includes input winding 4, and output winding 5. Similarly, storage core 2 has input winding 8 and ouput winding 9, and output core 3 has input winding 6 and output winding 7. In addition, cores 2 and 3 have drive windings 10 and 11, respectively. The A and B drive pulses applied to these windings may be provided by any suitable pulse generators, such as multivibrators. Windings 5, 6 and 9 are connected in series with each other to form a single loop interconnecting the three cores. As shown in the drawing, this loop may consist of but a single wire providing a single turn winding on each of the three cores. Input windings 4 and 8 on cores 1 and 2, respectively, are connected in series with each other. Transistor 12, shown as being of the NPN junction type having collector 13, base 14, and emitter 15, is connected from its collector to one terminal of winding 4. The transistor is biassed in the common emitter amplifier configuration in accordance with well known principles. The other terminal of winding 4 is connected via conductor 18 to one terminal of winding 8, the other terminal of which is connected through limiting resistor 19 to reference potential, such as ground 20. The emitter 15 of the transistor 12 is connected to a suitable source 16 of negative potential. An input signal is applied to the base 14 from input terminal 17. Output winding 7 of output core 3 is brought out to output terminals 24 and 25. An additional output may be obtained at terminal 21 connected to the upper terminal of resistor 19.

To aid in understanding the operation of the circuit, a dot notation has been applied to the core windings. These dots indicate like polarity terminals of the respective windings in accordance with standard transformer notation. This notation may also be explained in accordance with the following rules:

(1) Current into the dotted end of a winding on a core will switch it to the "0" state.

(2) Current into the undotted end of a winding on a core will switch it to the "1" state.

(3) A core switching to the "0" state induces a voltage across every winding with the dotted end being positive.

(4) A core switching to the "1" state induces a voltage across every winding with the dotted end being negative.

The transfer circuit of FIG. 1 operates as follows:

Assume the cores 1, 2, and 3 to be initially at "0" states (it will be seen hereinafter that at the conclusion of the cycle of operation, these cores will be returned to their "0" states). A positive input pulse applied to terminal 17 renders transistor amplifier 12 conductive, drawing current from reference potential through resistor 19, windings 8 and 4 on cores 2 and 1 respectively, and through the transistor to voltage source 16. Current is thereby flowing into the undotted ends of the input windings 8 and 4 and in accordance with the above described notation, both the cores 1 and 2 will be set to their "1" states. During this switching, a voltage is induced in each of the output windings 5 and 9. However, these windings each have the same number of turns and as shown by the dot notation are in opposing or bucking relationship. Therefore, the voltages induced in each of the windings will be approximately equal to each other and opposite in sense. Thus the voltages substantially cancel one another and no net current flow is present in the loop comprising windings 5, 6, and 9. At the conclusion of the input pulse then, cores 1 and 2 are in their "1" state and core 3 remains in its "0" state.

At this time, the A driving pulse is applied to the terminal 22 of winding 10 on storage core 2. This causes current flow into the dotted end of the winding 10 switching the core 2 to its "0" state. This switching induces a potential across the output winding 9 with the dotted end being positive. Current then flows from the dotted terminal of winding 9 into the undotted terminal of winding 6 on core 3 and into the dotted terminal of winding 5 of core 1. Thus the current into winding 6 tends to switch core 3 to its "1" state while the current into winding 5 tends to switch core 1 to its "0" state. Therefore, both windings 6 and 5 present equal impedances to the current flowing in the loop. As a result core 3 is switched substantially half way to its "1" state while core 1 is switched substantially half way to its "0" state.

The above described action can be explained by reference to the hysteresis curve of FIG. 2. The standard rectangular loop hysteresis characteristic of the magnetic core is shown in solid line. This characteristic is well known in the art and a detailed explanation thereof is believed unnecessary. It is believed sufficient to note that this curve is a plot of flux density, B, versus magnetizing force, H, and that points *a* and *b* denote respectively the points of positive and negative saturation. As will be recognized, when the core has been switched, for example to the "1" state by driving it with a magnetizing force equal to or greater than that at point *a*, upon cessation of the driving force, the core will return on its curve to the zero point on the H axis as indicated by the logical "1." The converse is true with respect to the logical "0," which results when the core is driven in the negative direction to the point *b* or beyond and then the driving force is removed. Assuming a core to be in its logical "0" condition (as is the case of core 3), if a magnetizing force just one half of that required to drive the core out to point *a* is applied, the core will follow the hysteresis characteristic to the point *a'*. When the force is removed, the core will then follow the dotted line and settle back approximately to the non-magnetized condition shown as point *x*. Should a negative, or demagnetizing force subsequently be applied to the core, the core will follow the dotted curve back to the negative saturation point *b* and upon cessation of this demagnetizing force, will assume the logical "0" condition. An identical, but inverted action occurs if this half switching takes place when the core is initially in its "1" logical condition, such as is the case with respect to core 1. This is shown by the dot-dash line in FIG. 2.

Figure 2:
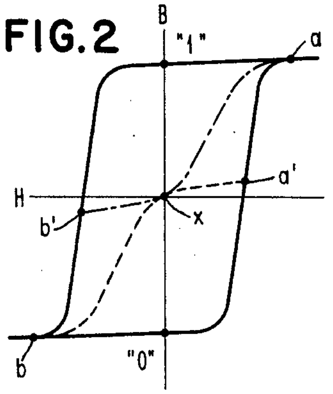
FIG. 2 is a graphical representation of the rectangular hysteresis loop characteristic of the magnetic cores used in this invention.

Referring back now to the circuit of FIG. 1, at the conclusion of the A driving pulse, core 2 has been reset completely to its "0" condition, core 1 has been half way reset to its "0" condition and is presently resting at point *x* in FIG. 2, and core 3 has been driven half way to its "1" condition and is also resting at point *x* of FIG. 2. During this time, the transistor 12 is non-conducting and accordingly no current flow in the windings 4 and 8 occurs. A potential is induced however across output winding 7 on core 3. As will be seen hereinafter, this particular potential will not be used, and will have no effect on succeeding circuitry.

Immediately following the A pulse, a B pulse is applied to terminal 23 which causes a current flow into the dotted end of winding 11 to reset the core 3 to its zero condition. The switching of core 3 back to its zero condition induces a voltage in the output winding 7 which, according to the convention used, will provide a positive level at upper terminal 24. A voltage is also induced across winding 6 with its dotted terminal being positive. This causes current flow in the loop into the dotted end of winding 5 on core 1 and into the undotted end of winding 9 on core 2. The former is thus driven towards its "0" state while the latter will be driven towards its "1" state. Core 1 however, is already switched half way to its "0" condition and thus will start to switch before core 2. A cumulative or "barreling" effect takes place whereby core 1 will switch completely to its "0" state before core 2 starts to switch to its "1" state. Since the switching of core 3 provided only enough energy to switch a core half way between its "0" and "1" states, the result is to return core 1 completely to its "0" state while leaving core 2 unaffected; i.e., in its "0" state. A complete cycle of operation is now completed and it is seen that cores 1, 2 and 3 have been returned to their "0" conditions ready to receive the next information input.

It will be obvious from the above described operation, that if the transistor 12 is not rendered conductive at the start of the cycle, cores 1 and 2 will not be initially switched to their "1" states, and the A and B drive pulses will not affect the cores 2 and 3. These cores will remain in their "0" states and no output will appear at terminals 24, 25. This would be the situation if the input applied at terminal 17 were representative of a logical "0." The absence of a pulse at the output terminals of the transfer stage during the B pulse portion of the cycle would indicated that a "0" had been transferred therethrough.

Figure 3:
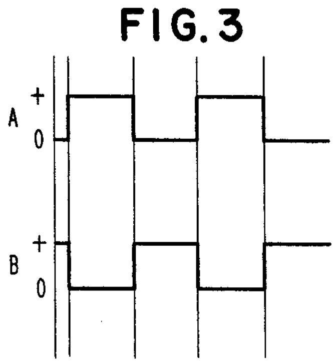
FIG. 3 is a diagram of the waveforms of the driving sources used with the transfer circuit.

Referring briefly now to FIG. 3, it will be seen that the A and B drive pulses are provided from a pair of interleaved regularly recurring pulse trains whereby the B pulse follows the A pulse. The transfer stage then delays the transfer of information therethrough by a time equal to the duration of the A pulse. Therefore, new information signals can be applied to the stage while the information supplied during the previous cycle is being read out or supplied to the following stage. Both information input and output occur during the B pulse time. The fact that core 1 is being reset to "0" during this time also does not affect this operation; the input signal supplied to the stage being of sufficient power to override this effect as well as to set the core to its "1" state. It is apparent that the net effect is the same as if the core were first set to "0" and then subsequently set to "1."

Figure 4:
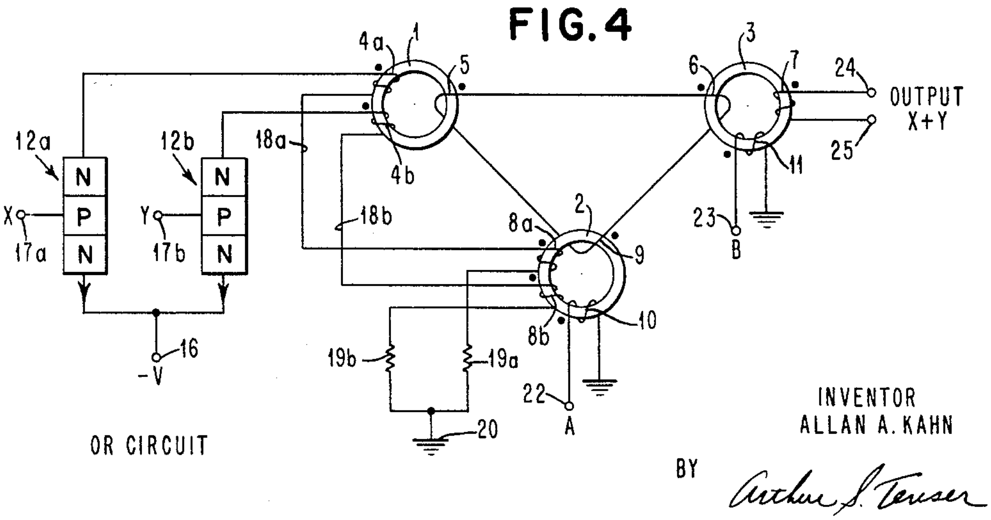
FIG. 4 is a circuit diagram of an OR logical circuit utilizing the basic transfer circuit of FIG. 1.

In FIG. 4 there is shown a modification of the translating circuit of FIG. 1 for performing the OR logical function. The circuit is substantially similar to that of FIG. 1 and like elements thereof have corresponding reference numerals. The circuit is identical to that of FIG. 1 except for the input arrangement. As can be seen, input core 1 has a pair of input windings, *4a* and *4b*, while storage core 2 similarly has a pair of input windings, *8a* and *8b*, The windings *4a* and *8a* are connected in series via conductor 18*a*. Similarly, conductor 18*b* couples windings *4b* and *8b*. Transistor 12*a* having input 17*a* connected to its base, has its emitter connected to a source of negative potential 16 and its collector connected to one terminal of the winding *4a*. Likewise, transistor 12*b* has a base input terminal 17*b* and has its emitter and collector terminals connected between voltage source 16 and the upper terminal of winding *4b* respectively. The lower terminals of windings *8a* and *8b* are connected through limiting resistor 19*a* and 19*b* respectively to reference or ground potential 20. The remainder of the circuit is identical to FIG. 1.

As is apparent from the drawing, the windings *4a*, *4b*, are each oriented similarly to the winding 4 of FIG. 1. Windings *8a* and *8b* are oriented the same way as winding 8 of FIG. 1. These windings also have the same number of turns as windings 4 and 8, and the transistor input circuits are made substantially identical to that of FIG. 1. With these considerations in mind, operation of the circuit is readily apparent. A positive input X or Y, to either of the transistors 12*a* or 12*b* will set both the input and storage cores to their "1" states, in exactly the same manner as the circuit of FIG. 1. Should both X and Y signals be present at the same time, the same result will be achieved inasmuch as the cores will return to their "1" states no matter how far into saturation they have been driven. Following the initial signal input, the remainder of the circuit operation proceeds exactly as described in connection with FIG. 1. It can be seen then, that an output will be developed across terminals 24, 25, only if X or Y or both have been supplied to the input terminals at the beginning of the cycle. This function is expressed in Boolean algebra form as $X+Y$.

If neither X or Y is applied, the cores 1 and 2 are not set to their "1" states. Accordingly, when the A reset pulse is applied to winding 10, no flux change in the core occurs and no current is induced in its output winding 9. Therefore output core 3 remains in its "0" state and upon application of the B pulse, no output is generated across the winding 7. There will be no outputs of the stage during this cycle of operation ,including that neither X*n* or Y has been applied at the input. Although a two way OR circuit has been illustrated in the drawing, it will be realized that any number of such input circuits may be provided to accommodate a larger number of variables.

The two way OR circuit of FIG. 4 may be simply modified to provide the logical functions expressed in Boolean notation as $X \cdot \overline{Y}$ (X and not Y) and $\overline{X} \cdot Y$ (not X and Y). The former may be achieved by merely reversing the sense of the windings *4b* and *8b* whereby they will buck windings *4a* and *8a* respectively. Thus, if both X and Y are applied, their effects on cores 1 and 2 cancel and these cores remain in their "0" states. If only Y is present, the result is merely to drive cores 1 and 2 further into saturation towards point *b* of FIG. 2, and they will return to "0" at the conclusion of the input. Only if X is present and Y not present ($\overline{Y}$) will cores 1 and 2 switch and the stage operate to produce an output at terminals 24, 25. The $\overline{X} \cdot Y$ function is achieved by reversing the polarities of windings *4a* and *8a* from those used to produce the $X \cdot \overline{Y}$ function.

Figure 5:
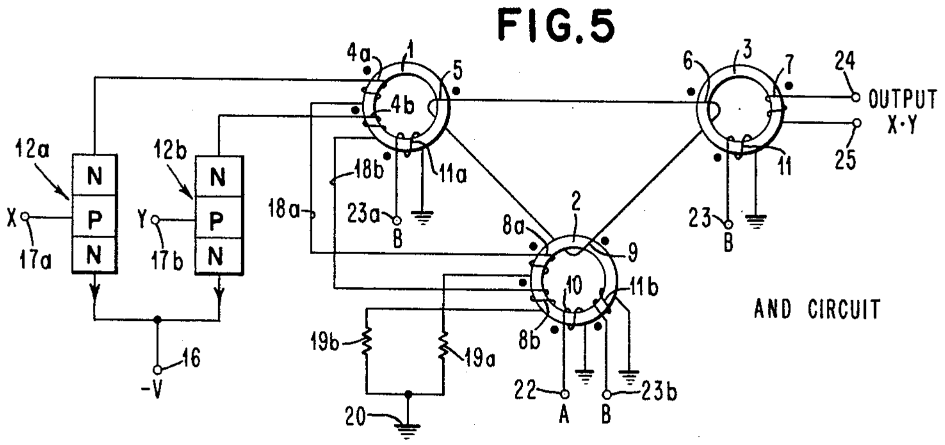
FIG. 5 is a circuit diagram of an AND logical circuit utilizing the basic transfer circuit of FIG. 1.

An AND circuit according to the invention is illustrated in FIG. 5. This circuit is identical to the OR circuit of FIG. 4 except for the provision of two additional windings. These additions comprise winding 11*a* on input core 1 and winding 11*b* on storage core 2. These windings have input terminals 23*a* and 23*b* respectively to which are applied B pulses as are applied to terminal 23 of winding 11. In practice, the terminals 23, 23*a* and 23*b* may actually be a single terminal.

As discussed above with respect to the operation of the basic transfer circuit of FIG. 1, the operation of the circuit takes place during two time intervals; a first interval during which the A pulse is applied and a second interval during which the input signal and the B pulse is applied. This simultaneous application of input signals and B pulses is used in the AND circuit operation. Except for the effect of the B pulse inputs on cores 1 and 2, operation of the AND circuit is identical to that of the OR circuit of FIG. 4. The windings 11*a* and 11*b* are oriented, as is shown by the dot notation, so that B pulse inputs to the respective terminals 23*a* and 23*b* will tend to switch the cores to their "0" conditions. Thus, should only one input, X or Y, be applied to the transistor inputs, there will be no net effect on the cores 1 and 2; the magnetizing force generated in the particular input winding being counteracted by the magnetizing force set up in the winding 11*a* or 11*b*. Only in the situation where both X and Y inputs are present will sufficient magnetomotive force be provided to the cores 1 and 2 to switch them to their "1" states. The cores 1 and 2 therefore, will switch only in the presence of inputs X and Y. The remaining operation of the circuit is exactly like that of FIG. 1 and an output will be provided at terminals 24 and 25 only when the AND condition is present at the inputs 17*a* and 17*b*; in Boolean notation, $X \cdot Y$. Although only two such inputs have been shown, it is apparent that any number may be provided, with suitable reset power being supplied to the bias windings 11*a* and 11*b*.

Figure 6:
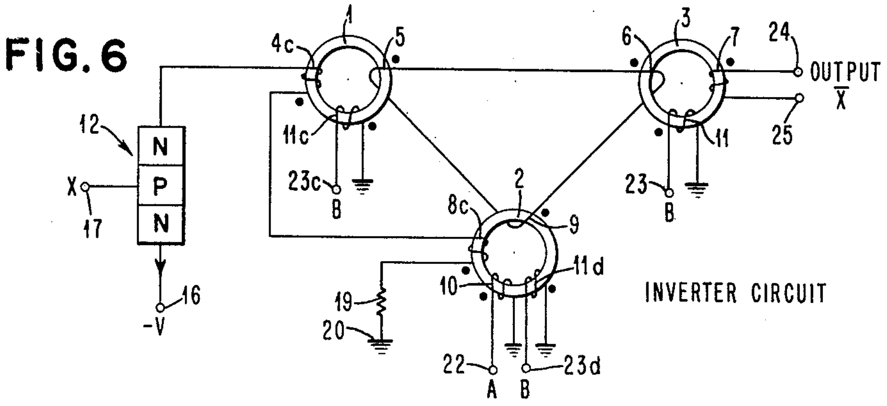
FIG. 6 is an inverter or inhibit circuit utilizing the basic transfer circuit of FIG. 1.

An inverter circuit utilizing the basic principles of this invention is illustrated in FIG. 6. As shown therein, input windings *4c* and *8c* on the cores 1 and 2 respectively are oriented such that the current through them upon conduction of the transistor 12 will tend to set their respective cores to the "0" state. This is opposite to the conditions of the circuit of FIG. 1. Additionally, the inverter circuit of FIG. 6 includes windings 11*c* and 11*d* on the cores 1 and 2 respectively to which B pulses are applied. From the dot notation applied to these windings, it will be seen that B pulses applied to the terminals 23*c* and 23*b* respectively will tend to switch their associated cores to their "1" states. In all other respects, circuit of FIG. 6 is identical to that of FIG. 1.

Bearing in mind that input signals and B pulses will be applied during the same interval, the circuit operates as follows. When a positive input signal X, indicative of a "1" input, is applied to the transistor 12, it conducts, drawing current through the windings 4*c* and 8*c*. These currents however, are in direction to reset the cores 1 and 2 to "0." During the same interval, B pulses are applied to the windings 11*c* and 11*d* tending to switch the cores 1 and 2 to their "1" conditions. The effect of the windings 4*c*, 11*c* and 8*c*, 11*d* is to produce no net flux in their respective cores 1 and 2 and no output will be generated in the windings 5 and 9. Since neither core 1 nor 2 was switched during the application of the input signal, it will be readily apparent that no output will be provided at terminals 24, 25 at the conclusion of the cycle. This is indicative of the complement or inverse of the input, $\overline{X}$. Should no input (logical "0") be applied to terminal 17 at the beginning of the cycle of operations, the B pulse applied to windings 11*c* and 11*d* will set the cores 1 and 2 respectively to the "1" states. The remaining operation of the stage will be identical to that of the basic transfer stage of FIG. 1 and an output will be produced at terminals 24, 25 at the next B pulse time. Therefore, the circuit produces an output X when no input, $\overline{X}$, is applied at the input. The circuit therefore provides the invert function.

Figure 7:
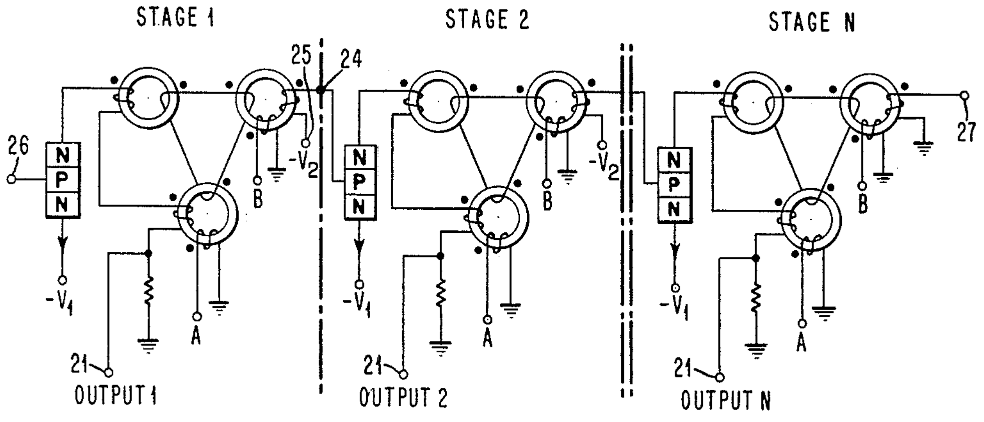
FIG. 7 is a circuit digram of a shift register or timing ring utilizing the basic transfer circuit of the invention.

The versatility of the basic transfer circuit is further illustrated in the circuit of FIG. 7. This figure shows a shifting register or ring composed of a plurality of the basic transfer circuits of FIG. 1 connected in cascade. As shown more specifically between stages 1 and 2, the output terminals 24 and 25 of each stage are coupled between the input to the transistor of the succeeding stage and a source of negative potential $V_2$. To maintain the succeeding transistor in its non-conducting condition in the absence of the pulse of the proper polarity at the output of the preceding stage, the voltage $V_2$ is made slightly more negative than the emitter voltage $V_1$ of the transistors. This difference need be sufficient only to reverse bias the base-emitter junction of the transistor in the absence of an input signal. Referring back to the operation of the circuit of FIG. 1, it was noted that an output is produced at terminals 24 and 25 during the setting of the core 3 half way towards "1" and during the resetting of the core to "0." In the former case, the voltage induced in the winding 7 would be such as to make terminal 24 negative with respect to 25. As can be seen from the interconnection of stages in FIG. 7, this voltage would merely further reverse bias the succeeding transistor and thus have no effect on the circuit. The other output however, produces a positive level at terminal 24 which would be sufficient to render the transistor in the succeeding stage conductive. As will be appreciated from considereation of the circuit of FIG. 7, information introduced at input terminal 26 of Stage 1 will be shifted excessively through the stages to the output terminal 27 of the last Stage N. Since a cycle of operation of each stage requires both an A and a B pulse, this register is of the two step per bit type, requiring two separate pulse intervals to shift the information one stage. The output terminals 21 of each stage provide an indication of the content of the information being transferred into the stage and also allows the register to be used as counting or timing ring N stages have been shown to indicate that this type of arrangement is adaptable to any number of stages desired.

The basic transfer circuit described hereinabove provides a relatively simple and inexpensive logical connective utilizing magnetic cores and transistors, whereby the reliability and other advantages of these solid state elements are utilized. The basic circuit is readily adaptable to provide all of the logical functions necessary to produce an entire computing system. The unique arrangement of components permits these functions to be attained with a minimum of components and requires less driving power than circuits of the same class heretofore known.

It will be understood that transistors of other types may be used with suitable changes in bias potentials or that other amplifying devices may be employed in each stage.

While the invention has been particularly shown and described with reference to preferred embodiments thereof, it will be understood by those skilled in the art that various changes in form and details may be made therein without departing from the spirit and scope of the invention.

What is claimed is:

1. A logical circuit comprising:

(*a*) first, second and third rectangular hysteresis loop magnetic cores having at least an input winding and an output winding, and additional windings as required;

(*b*) closed loop means connecting the output windings of said first and second cores and the input winding of said third core in series, the output windings of said first and second cores having turns relationship and orientation to induce negligible output on the closed loop upon simultaneous switching of said first and second cores;

(*c*) data input means coupled similarly to the input windings of both said first core and second core to set said first and second cores;

(*d*) clock means for generating interleaved A and B pulse trains; and (*e*) clock connection means, for applying the A pulse train to an additional winding on said second core to reset said second core and thereby to switch said first and third cores part way to their reset and set states respectively, and for applying the B pulse train to an additional winding on said third core to reset said third core, and thereby provide output and reset said first core.

2. A logical circuit according to claim 1 wherein said data input means (*c*) includes a plurality of data input windings each coupled similarly to both said first core and said second core, a like plurality of data input signal source terminals, and a like plurality of amplifier means coupling each of said data input signal source terminals with a respective one of said data input windings.

3. A logical circuit according to claim 1 wherein said clock connection means (*e*) includes means for applying the B pulse train to an additional winding on said second core.

4. A logical circuit according to claim 1 wherein said clock connection means (*e*) includes means for applying the B pulse train to an additional winding on said second core.

References Cited in the file of this patent

UNITED STATES PATENTS

| | | |
|---|---|---|
| 2,886,801 | Briggs | May 12, 1959 |
| 2,894,151 | Russell | July 7, 1959 |
| 2,904,779 | Russell | Sept. 15, 1959 |
| 2,910,677 | Bloch | Oct. 27, 1959 |
| 2,970,297 | Kauffman | Jan. 31, 1961 |

UNITED STATES PATENT OFFICE
CERTIFICATE OF CORRECTION

Patent No. 3,157,794 November 17, 1964

Allan A. Kahn

It is hereby certified that error appears in the above numbered patent requiring correction and that the said Letters Patent should read as corrected below.

Column 1, line 45, after "single" insert -- turn --; column 5, line 41, the comma should be a period; column 6, line 7, for "including that neither Xn or" read -- indicating that neither X nor --; column 8, line 52, for the claim reference numeral "1" read -- 2 --.

Signed and sealed this 4th day of May 1965.

(SEAL)
Attest:

ERNEST W. SWIDER
Attesting Officer

EDWARD J. BRENNER
Commissioner of Patents